(12) United States Patent
Noonen et al.

(10) Patent No.: US 6,282,272 B1
(45) Date of Patent: *Aug. 28, 2001

(54) TELEPHONE WEB BROWSER ARRANGEMENT AND METHOD

(75) Inventors: Michael Noonen, Moutain View; Kevin Deierling, Los Altos Hills; Keith Barraclough, Menlo Park; Bryan R. Martin, Campbell; Yuenwah Sing, Santa Clara; Joseph L. Parkinson, Santa Clara, all of CA (US)

(73) Assignee: Netergy Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,125

(22) Filed: Mar. 9, 2000

Related U.S. Application Data

(63) Continuation of application No. 09/031,081, filed on Feb. 26, 1998, which is a continuation of application No. 08/706,486, filed on Sep. 4, 1996, now Pat. No. 5,761,280.

(51) Int. Cl.[7] .................................................. H04M 11/00
(52) U.S. Cl. ..................... 379/93.27; 379/93.05; 379/93.18
(58) Field of Search ............... 379/93.01, 93.05, 379/93.08, 93.12–93.13, 93.17–93.18, 93.25–93.27, 93.37, 202, 90.01; 348/14–17; 345/326, 330, 334

(56) References Cited

U.S. PATENT DOCUMENTS

| | | | |
|---|---|---|---|
| 4,124,773 | 11/1978 | Elkins | 379/101.01 |
| 4,451,701 | 5/1984 | Bendig | 379/93.25 |
| 4,499,568 | 2/1985 | Gremillet | 379/101.01 |
| 4,532,378 | 7/1985 | Nakayama et al. | 379/93.18 |
| 4,734,765 | 3/1988 | Okada et al. | 345/194 |
| 4,737,980 | 4/1988 | Curtin et al. | 379/93.18 |
| 4,751,578 | 6/1988 | Reiter et al. | 348/13 |
| 5,089,885 | 2/1992 | Clark | 348/7 |
| 5,236,199 | 8/1993 | Thompson, Jr. | 348/14 |
| 5,327,554 | 7/1994 | Palazzi, III et al. | 348/13 |
| 5,341,167 | 8/1994 | Guichard et al. | 348/14 |
| 5,481,297 | 1/1996 | Cash et al. | 348/13 |
| 5,495,284 | 2/1996 | Katz | 379/15 |
| 5,592,538 | 1/1997 | Kosowsky et al. | 379/93.08 |
| 5,640,195 | 6/1997 | Chida | 348/14 |
| 5,761,280 | 6/1998 | Noonen et al. | 379/93.27 |
| 5,764,276 | 6/1998 | Martin et al. | 348/15 |
| 5,799,063 | 8/1998 | Krane | 379/88.17 |
| 5,838,682 | 11/1998 | Dekelbaum et al. | 379/90.01 |
| 5,884,262 | 3/1999 | Wise et al. | 379/67.1 |

*Primary Examiner*—Curtis Kuntz
*Assistant Examiner*—George Eng
(74) *Attorney, Agent, or Firm*—Crawford PLLC

(57) ABSTRACT

The present invention provides a method and interface for browsing the internet using a telephone circuit having keys for generating DTMF codes. The interface includes a memory and a processor and is coupled to the telephone circuit and display. The interface receives a first DTMF code requesting access to the internet and, in response to the first DTMF code, loads a Web browser in its memory. The interface then receives a second DTMF code from the telephone circuit and converts the second DTMF code into a Web browser command using an interpretation protocol. The Web browser command is then executed using the interface, thereby enabling a user to access the internet via manual operation of the keys of the telephone is circuit.

9 Claims, 6 Drawing Sheets

FIG. 2

```
     1          2          3
    NW          N         NE
     4          5          6
     W        HOME         E
     7          8          9
    SW          S         SE
     *          0          #
   MENU 1    SELECT      MENU 2
```

FIG. 3

```
      1          2            3
    FILE       EDIT         VIEW
      4          5            6
     GO      BOOKMARK      OPTIONS
      7          8            9
  DIRECTORY   WINDOW        HELP
      *          0            #
    MENU 1    MENU 2       MENU 3
```

TELEPHONE WEB BROWSER ARRANGEMENT AND METHOD

This application is a continuation of Ser. No. 09/031,081 filed Feb. 26, 1998 (now U.S. Pat. No. 6,133,940), which is a continuation application of Ser. No. 08/706,486 filed Sep. 4, 1996 (now U.S. Pat. No. 5,761,280), which applications are incorporated herein by reference.

FIELD OF THE INVENTION

The present invention relates generally to an internet browser, and more particularly, to a method and arrangement for browsing the internet using a telephone circuit having keys for generating DTMF codes.

BACKGROUND OF THE INVENTION

With the fast growing popularity of the Internet and the World Wide Web (also known as "WWW" or the "Web"), there is also an increasing demand for inexpensive Web browsers. Web browsers are typically graphical user interface (GUI) software programs which provide users access to the Web. Web browser users simply maneuver a pointer about the GUI and select various graphical icons to invoke features of the Web browser.

Typically, the Web browser software programs are executed on sophisticated personal computers. Such computers typically include a multi-purpose central processing unit (CPU) chip or chip set, various input devices including a mouse pointing device and a keyboard, a display, as well as fixed and/or removable data storage devices and their associated media. These personal computer systems are typically bulky, expensive and often inconvenient as they require a user to operate them at a desktop and/or carry extraneous devices.

Accordingly, there exists a need in the telecommunications industry for an inexpensive and convenient apparatus and method which overcomes the aforementioned deficiencies.

SUMMARY OF THE INVENTION

The present invention provides a method and interface for browsing the internet using a telephone circuit having keys for generating DTMF codes. The interface includes a memory and a processor and is coupled to the telephone circuit and a display. The interface receives a first DTMF code requesting access to the internet and, in response to the first DTMF code, loads a Web browser in its memory. The interface then receives a second DTMF code from the telephone circuit and converts the second DTMF code into a Web browser command using an interpretation protocol. The Web browser command is then executed using the interface, thereby enabling a user to access the internet via manual operation of the keys of the telephone circuit.

Advantageously, the interface may be adapted for use with conventional telephones, or in other embodiments, may be provided within the telephone itself.

These and various other features and advantages of the present invention are pointed out with particularity in the appended claims. However, for a better understanding of the invention, its advantages, and the objects obtained by its use, reference should be made to the drawings which form a further part hereof, and to accompanying descriptive matter, in which there is illustrated and described specific exemplary embodiments in accordance with the invention.

BRIEF DESCRIPTION OF THE DRAWINGS

Referring now to the drawings in which like reference numbers represent corresponding parts throughout:

FIG. 2 is a block diagram illustrating an exemplary conversion protocol for use with the system of FIG. 1;

FIG. 3 is a block diagram illustrating an another exemplary conversion protocol for use with the system of FIG. 1;

The above figures and the following description are intended to exemplify exemplary embodiments of the present invention. It is to be understood that other embodiments may be utilized and structural and functional changes may be made without departing from the spirit and scope of the present invention.

DETAILED DESCRIPTION OF THE DRAWINGS

Figure 1:
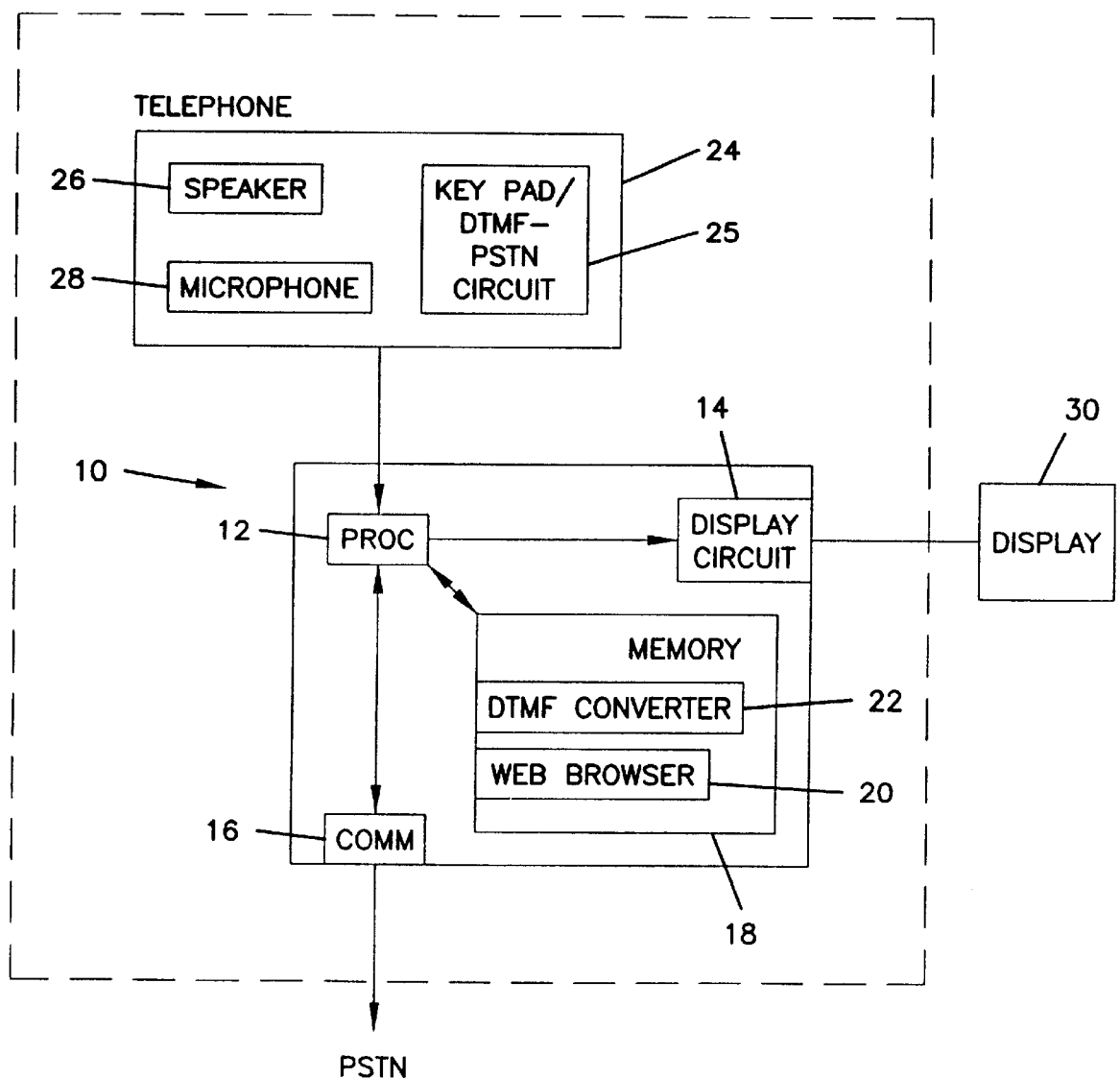
FIG. 1 is a block diagram illustrating an exemplary system in accordance with the principles of the present invention.

FIG. 1 is a block diagram which illustrates an exemplary interface 10 for browsing the internet using a telephone 24 having a key pad/DTMF-PSTN circuit 25 with keys for generating DTMF codes. Interface 10 includes a processor 12, such as a reduced instruction-set computing (RISC) chip, coupled to a display circuit 14 and a communication component 16. Communication component 16 includes hardware along with supporting firmware and/or software, and is included on interface 10 to provide an interface with a communication network, such as a public switched telephone network (PSTN), the internet, local area networks, and/or wide area networks. Display circuit 14 includes hardware along with supporting firmware and/or software and is included to provide an interface with a display 30. Display 30 may be any type of display such as a television or computer monitor, an LCD display integrated directly into phone, and the like. The display circuit 14 may be, for example, a video card or other circuit suitable for the type of display used.

Processor 12 is further coupled to a memory 18. Under control of the processor 12, software modules, such as a DTMF converter module 22 and a Web browser 20, may be loaded from a data storage device into memory 18 of the interface 10 for use during actual operations. Typical Web browsers which may be executed on the interface 10 include IBM's Net Explorer, NetScape and Mosaic. As is appreciated by those skilled in the art, Web browser 20 may be connected via communications component 16 and PSTN to a Web server executing a Web daemon such as IBM's HTTP daemon or other WWW daemon.

The Web browser 20 typically provides a graphical user interface (GUI) having a pointer which may be maneuvered about a screen to select various graphical icons to invoke a features of the Web browser 20. The graphical icons may represent, for example, hyperlinks to various uniform resource locators (URL) or pull down menus, such as a file menu or a bookmark menu, for interfacing with the internet and/or the Web browser 20.

The present invention utilizes DTMF tones from the key pad 25 of the telephone to provide input to the GUI Web browser. The keys on the input pad 25 when depressed may issue a DTMF tone that may be detected and interpreted by DTMF converter module 22 as Web browser 20 commands. These commands can be user or product specific. In addition, the key pad assignments may change as desired by loading different conversion (interpretation) protocols into the interface 10.

FIGS. 2 and 3 illustrate exemplary interpretation protocols of the converter software module 22. In FIG. 2, an interpretation protocol of the telephone key pad 25 for maneuvering the pointer about the GUI of Web browser 20 is depicted. The DTMF tones associated with key pads numbered 1–9 correspond to various directional movements of the GUI pointer as shown in FIG. 2. The "0" (zero) key pad may be used to execute or select a function associated with an icon to which the pointer is pointing. The "★" and "#" key pads may be used to change the protocol conversion thereby generating a different menu assignment.

FIG. 3 is another exemplary illustration of a interpretation protocol. For example, the protocol interpretation illustrated in connection with FIG. 3 may be an interpretation protocol resulting from a depression of the "★" key pad under the protocol illustrated in the previous Figure. Furthermore, in the protocol of FIG. 3, the DTMF tones associated with the keys numbered 1–9 correspond to various pull down menus associated with Web browser 20. The "0" (zero), "★", and "#" key pads correspond to additional menus and thus may also be used to change the protocol conversion. In this manner, the key pad of a telephone circuit provides input for interacting with the Web browser 20. In accordance with an aspect of the invention, a telephone coupled with a display via the interface 10, may become an internet browser. In accordance with one embodiment of the invention, described more fully below, the internet browser is integrated with video phone circuitry which is also controlled using the telephone keypad to generate DTMF signals. In the combination Web browser/video phone, the core elements of the system (e.g., the processing unit, memory, display circuitry, etc.) may be used to accomplish multiple functions, thereby greatly increasing the functionality of the system without significantly increasing the costs.

Figure 4:
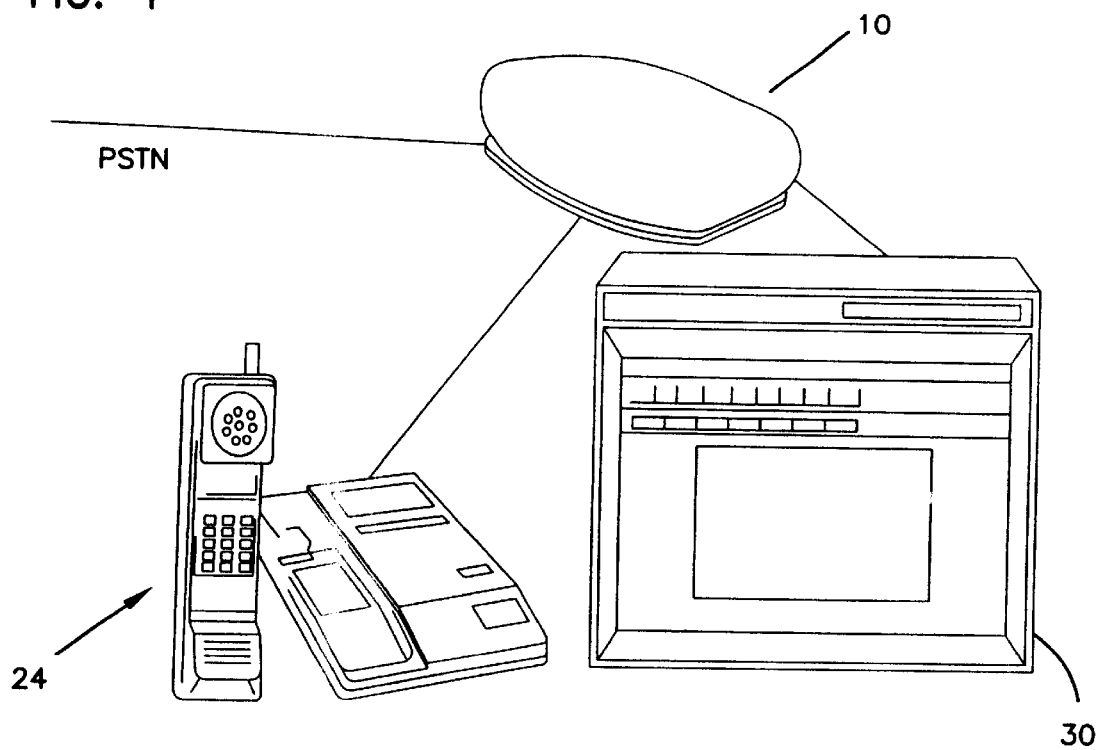
FIG. 4 is a pictoral diagram of an interface configured in accordance with the present invention and adapted for use with a conventional telephone.

FIG. 4 illustrates an interface 10 adapted for use with a conventional telephone. The interface 10 may be provided with receptors, such as input and output receptacles, for connecting the interface 10 to the display 30, a standard telephone 24, and an appropriate communications network. The receptors, for example, may be configured for receipt of conventional telephone wire adaptors. The interface 10, is connected between a standard telephone and a public switched telephone network (PSTN) using standard connections. The interface 10 further includes a standard video output which connects to the display 30. For example, the video out may be in the term of a standard coaxial connector for a television which may be used as the display 30. Such a system enables conventional telephones and television sets to be readily and inexpensively modified for connection to the internet as Web browsing devices.

Figure 5:
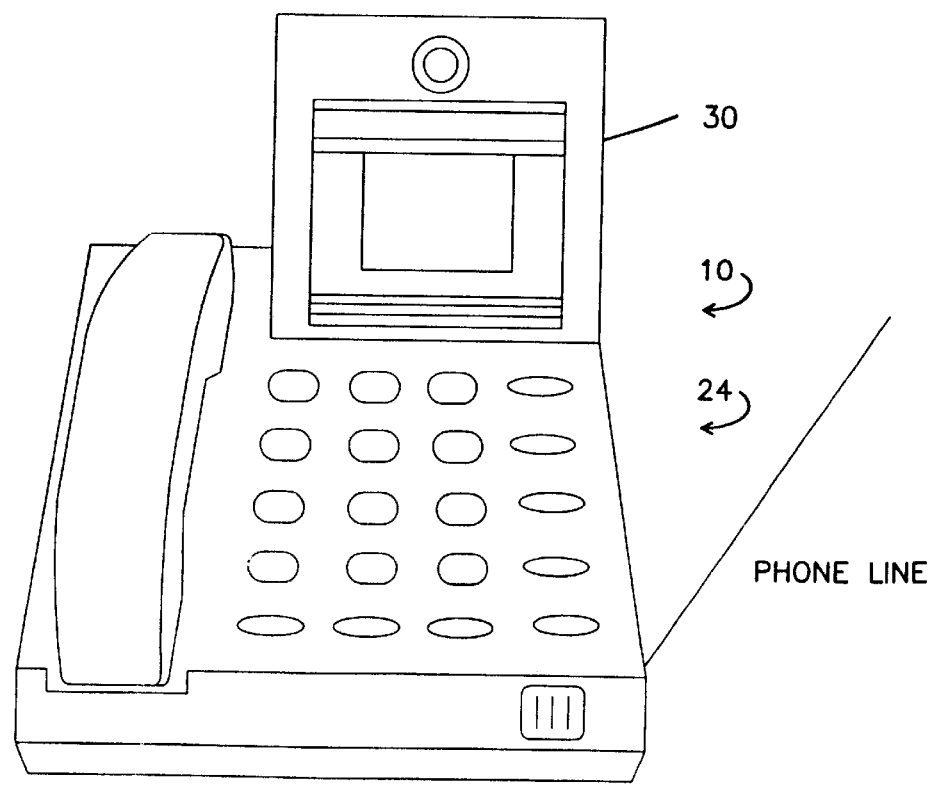
FIG. 5 is a pictoral diagram of a telephone including an interface configured in accordance with the present invention.

As illustrated in FIG. 5, interface 10 may be alternatively provided as a chip in a telephone unit including both a key pad/DTMF-PSTN circuit 25 and a built in display,30. Alternatively, the circuit 25 and interface 10 may be in one unit and the display 30 may be external thereto. The telephone handset may be portable thereby providing convenient access and use.

Figure 6:
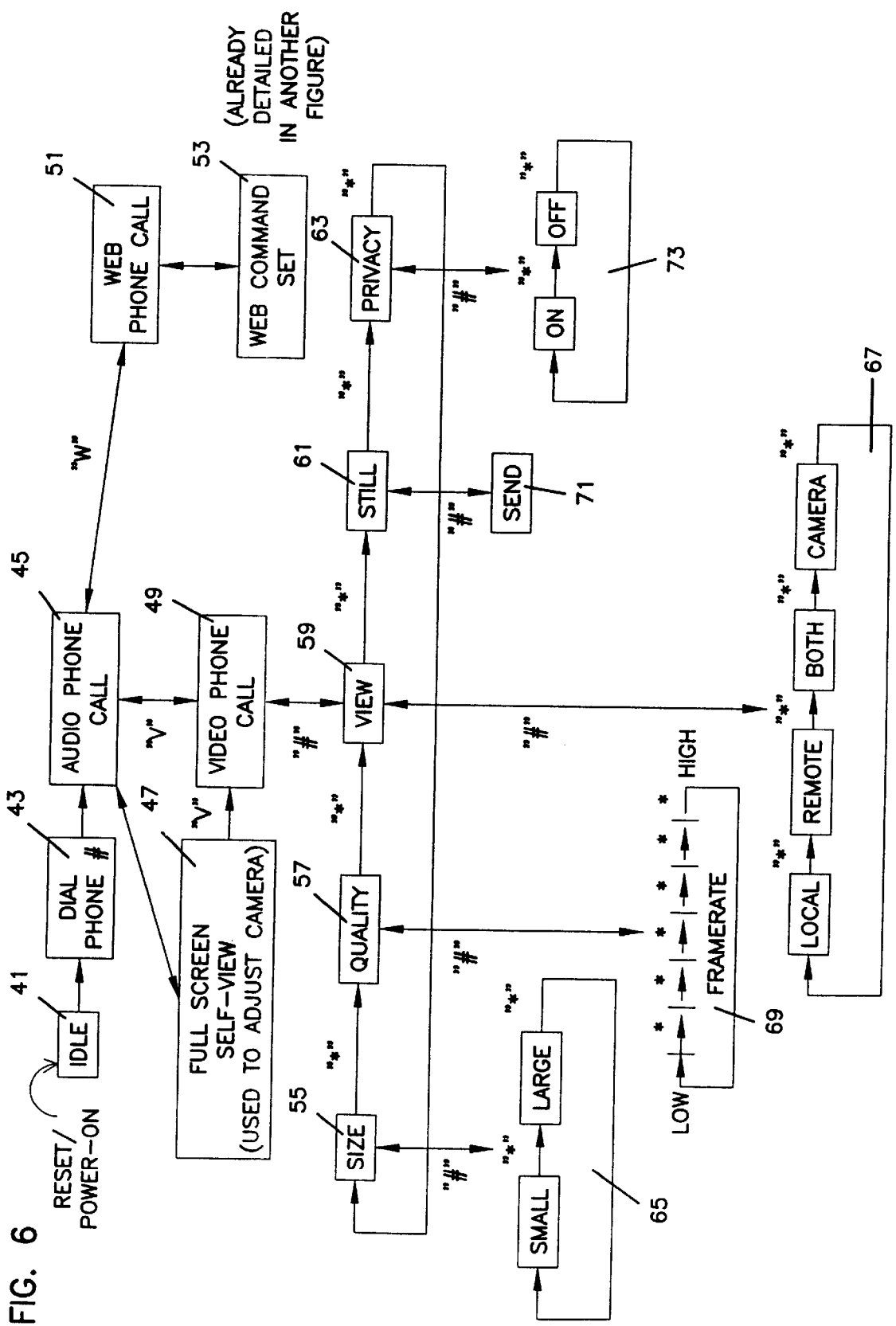
FIG. 6 is a flow diagram of control of a combined web browser/video phone arrangement.

FIG. 6 illustrates an exemplary control flow diagram for a combined web browser/video phone. It will be understood that the interface 10 circuitry used to implement the web browser functions can also be used to recognize DTMF codes and to implement the described video phone control. For example, a separate software routine may be loaded in the memory 18 for use when a video phone mode is initiated. This routine would provide the necessary protocol to generate the appropriate video phone control signals in response to specific DTMF signals.

In FIG. 6, when the combined web browser/video phone is reset or powered on, the device assumes an idle mode 41. A user may then initiate a call by dialing a phone number at mode 43. Initially, in the embodiment illustrated in FIG. 6, an audio phone call mode 45 is established. From the audio phone call mode 45, the user may initiate various commands using DTMF signals to enter various modes of the web browser/video phone. In the illustrated example, if the user enters a "##", the system enters a full screen self-view display mode 47. The full screen self-view mode 47 is used to adjust the camera used for the video phone. If, during the audio phone call mode 45 or the full screen self-view mode 47, a DTMF signal "#V" is entered by the user, the phone enters a video phone call mode 49. If an during the audio phone call mode 45 a "#W" is initiated, a web phone call mode 51 is entered. The web phone call mode 51 and web command mode 53 operate in a manner similar to that described below in connection with FIGS. 7 and 8.

It should be appreciated that the video phone call mode 49 can be entered at any time during the audio phone call mode 45. More particularly, while an analog phone channel may be established between two phones initially, by depressing the DTMF control "#V" the video phone call mode 49 will be entered and a digital communication channel between the two phones will be established. Once the system enters the video phone call mode 491 an appropriate software module is provided to carry out various video controls in response to the DTMF signals.

From the video phone call state 49 a DTMF signal "##" may he entered which initiates a view mode 59. At this point, various control modes may be stepped through. In the illustrateed loop, a size mode 55, a quality mode 57, a view mode 59, a still mode 61, and privacy mode 63 are successively accessed by repeatedly depressing the "★" key on the key pad. From the size mode 55, by depressing the "#" key a new mode 65 may be entered to increase and decrease the size of the screen. From the quality mode 57, a mode may be entered to increase or decrease the frame rate 69. From the view mode 59, various camera control modes 67 may be entered to provide control of the local view, remote view, both views and the camera. From the still mode 61, a sense mode 71 may be entered. Finally, from the privacy mode 63, a control mode 73 may be entered to turn on and off a privacy feature of the video phone.

As will be appreciated, in this manner, a single telephone device having the interface unit 10 implemented in conjunction therewith may be used to perform audio and video phone calls and to function as a web browser. In response to various DTMF signals, the various modes may be selected and the DTMF signals are than used depending upon the DTMF protocol conversion to control the appropriate phone mode. It should be appreciated that the order of the modes and the DTMF codes could be changed without departing from the spirit and scope of the disclosed embodiment. For example, it may be desirable to determine whether a web phone call is being placed prior to initiating the audio phone call. Such changes may be implemented by changing the protocol recognition of the control software. In particular, a control software module would be applied to recognize various commands which would initiate subroutines for the various types of phone calls to be controlled.

Figure 7:
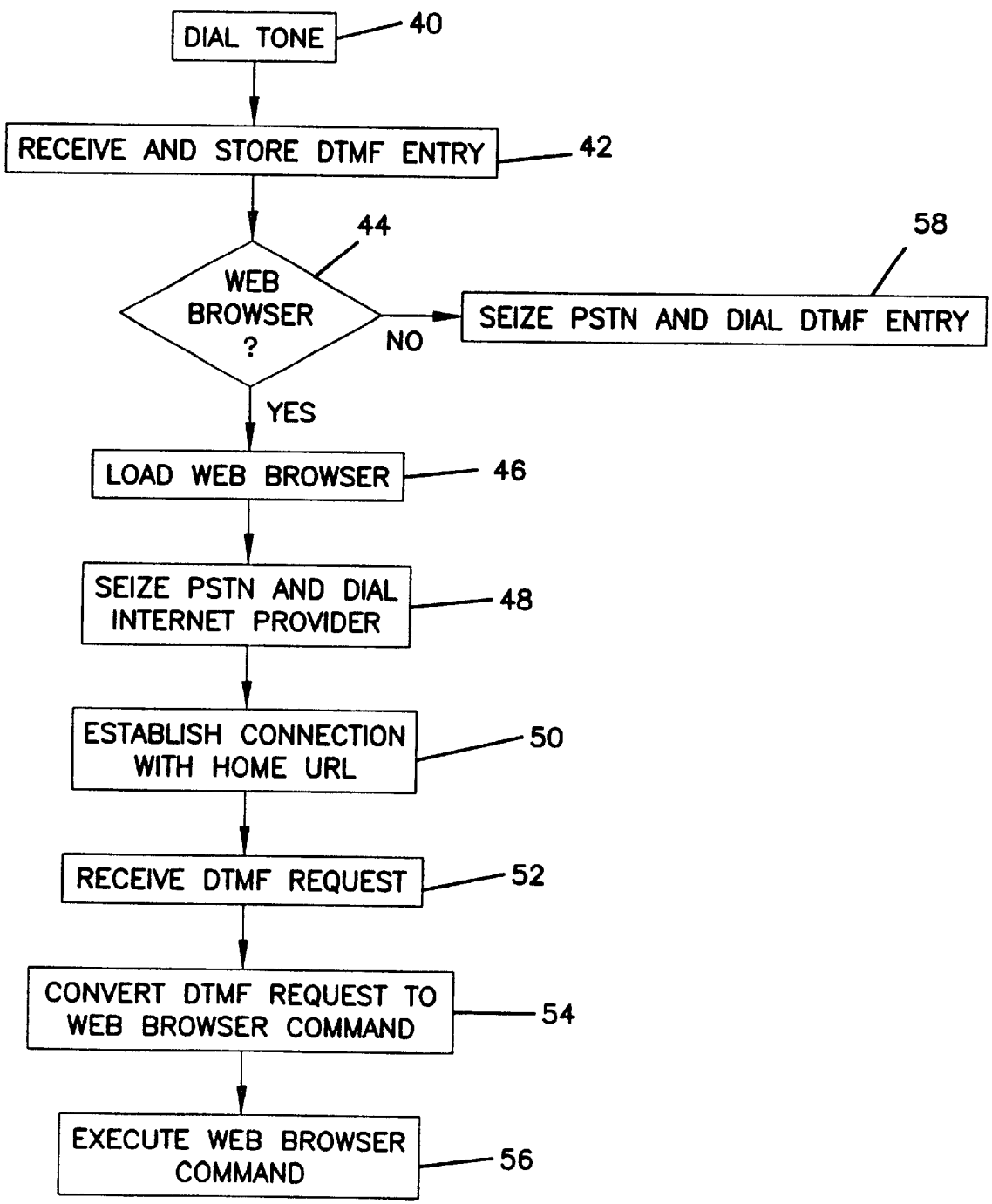
FIG. 7 is a flow chart illustrating steps which may be performed by an exemplary interface of the system of FIG. 1.

FIG. 7 is a flowchart illustrating in greater detail the general flow performed by an exemplary interface 10 in implementing an internet browser in accordance with an embodiment of the present invention. Block 40 represents interface 10 generating a dial tone for output by the speaker of telephone 24. The dial tone may be simulated or otherwise controlled to allow the interface 10 to recognize and implement DTMF control signal input using the telephone keypad. Block 42 represents interface 10 receiving a DTMF code from the keypad of a telephone. The DTMF code is stored in the memory 18 of interface 10.

Decision diamond 44 represents the interface 10 determining whether the received DTMF code represents a request to execute Web browser 20 and access the Web. For example, in the embodiment of FIG. 6, this code would correspond to "#W". Step 44 compares the DTMF code to a variable stored in the memory 18 of the interface. In another embodiment, the variable and DTMF code for accessing the Web may be, for example, the telephone number of a local access provider such that when the local access provider is dialed the internet browser is automatically initiated.

If the received DTMF code does not represent a request to execute Web browser 20 for accessing the Web, control may move to block 58 where the interface seizes the communications network line or PSTN line and dials, for example, the telephone number associated with the DTMF code of block 42. Otherwise, as indicated by block 46, interface 10 loads Web browser 20 into memory 18.

Following block 46, interface 10 seizes the communications network or PSTN line and dials a number for accessing the internet, for example, a number for the local internet access provider. The telephone number of the access provider may be stored in memory 18 and may be the DTMF code received at block 42.

Next, interface 10 establishes a connection with a uniform resource locator (URL) home page or internet site. The home page URL is typically predefined in Web browser 20 by the user. Interface 10 then waits for the telephone user to enter a DTMF code corresponding to a Web browser command. Block 52 represents interface 10 receiving a DTMF code from the user.

After receiving the DTMF code, the DTMF code is converted to a Web browser command using the current interpretation protocol of the converter software module 22. This step includes constructing a Web browser command in accordance with the protocol of Web browser 20 software. The Web browser command is then executed by the Web browser as indicated by block 56.

Figure 8:
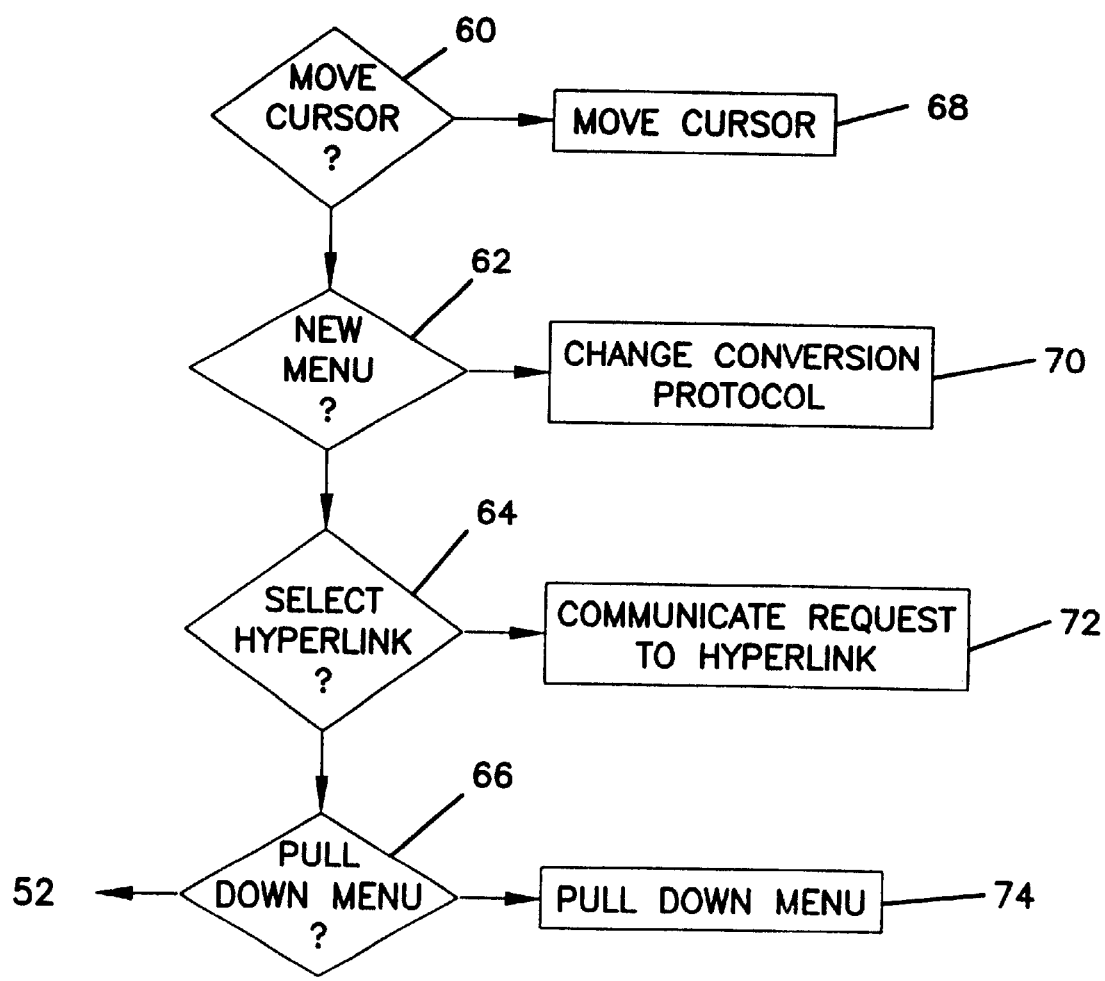
FIG. 8 is a flow chart illustrating which may be performed by an exemplary interface of the system of FIG. 1 in executing a Web browser command.

FIG. 8 is a flowchart illustrating the steps performed by interface 10 in executing a Web browser command. Decision diamonds 60–66 represent the interface 10 identifying the Web browser command and responding accordingly. It is noted that the order in which the interface 10 identifies a response to the Web browser commands is provided by way of example and not limitation.

Decision diamond 60 represents the interface 10 determining whether it received a request to move the pointer. If so, block 68 represents interface 10 moving the pointer on the display 30 accordingly.

Decision diamond 62 represents the interface 10 determining whether it received a request for a new menu. If so, control moves to block 70 where the interpretation protocol of the converter module 22 (and thereby the functions of the key pads) is changed.

Decision diamond 64 represents interface 10 determining whether it received a request selecting a hyperlink. If so, block 72 represents interface 10 communicating with the URL associated with the hyperlinked item. This step includes establishing a connection with the particular URL and typically displaying graphical data received from the URL on the display 30.

Decision diamond 66 represents interface 10 determining whether it received a request to display a pull-down menu of Web browser 20. If so, block 74 represents the interface 10 displaying the request of pull-down menu on the display 30.

After executing the Web browser command, interface 10 control returns to block 52 where interface 10 waits to receive another DTMF code.

The foregoing description of embodiments of the present invention has been presented for the purposes of illustration and description. It is not intended to be exhaustive or to limit the invention to the precise form disclosed. Modifications and variations are possible in light of the above teaching. It is intended that the scope of the invention not be limited by this detailed description, but rather extend to cover the full and fair scope of the claims set forth below.

What is claimed is:

1. A combined video-phone and web browser, comprising:

a telephone circuit having keys for generating key codes;

a processor coupled with the telephone circuit;

an interface circuit adapted to communicatively couple the processor in a communications network;

first means for receiving a first key code requesting access to the internet, for loading a web browser program in the processor in response to the first key code, for receiving a second key code from the telephone circuit, and for determining that one of the first and second key codes commands initiation of an internet server or an audio phone mode;

second means for converting the second code into a web browser command using an interpretation protocol, for executing the web browser command using the web browser program, and for accessing the internet via manual operation of the keys of the telephone circuit; and a housing encasing the telephone circuit, the processor, the interface circuit, the first receiving means, and the second and means.

2. The combined video-phone and web browser, according to claim 1, further including a communications circuit configured and arranged to communicate the web browser command to an internet site, the communication circuit receiving data from the internet site; and a display circuit for displaying the received data on the display.

3. The combined video-phone and web browser according to claim 2, wherein the display circuit is configured and arranged as part of a member extending in a manner substantially normal to a plane at which the keys are located.

4. The combined video-phone and web browser according to claim 3, further including a camera mounted on the member, the camera having a lens arranged adjacent the display and directed to capture images along a line passing over the keys.

5. The combined video-phone and web browser according to claim 4, wherein the telephone circuit is communicatively coupled to a telephone handset configured and arranged to mate with the housing at a location that does not block a user from viewing the display and that does not block the line emanating from the lens of the camera.

6. The combined video-phone and web browser of claim 1, further comprising:

a camera configured and arranged to output video signals representative of images of scenes captured by the camera and a display driver circuit; wherein the processor is coupled to a communications channel and configured to display user-recognizable control signals through the display circuit, to recognize key code sent from the telephone circuit.

7. The combined video-phone and web browser of claim 6, wherein the key codes are DTMF codes.

8. The combined video-phone and web browser of claim 1, wherein the key codes are DTMF codes.

9. The combined video-phone and web browser of claim 1, wherein said processor is integrated with at least one of said first means and second means.

* * * * *